United States Patent
Mandair et al.

(10) Patent No.: US 6,286,966 B1
(45) Date of Patent: Sep. 11, 2001

(54) PC-EYE REAR VIEW DUAL MIRROR ASSEMBLY WITH CONVEX MIRROR

(76) Inventors: Gurmit Singh Mandair; Kamaljit Kaur Mandair, both of 10491 E. Prentice Ave., Englewood, CO (US) 80111

( * ) Notice: Subject to any disclaimer, the term of this patent is extended or adjusted under 35 U.S.C. 154(b) by 0 days.

(21) Appl. No.: 09/523,471

(22) Filed: Mar. 10, 2000

(51) Int. Cl.[7] .................................................. G02B 7/182
(52) U.S. Cl. ........................ 359/850; 359/859; 359/862; 359/864
(58) Field of Search .................................... 359/850, 859, 359/860, 862, 864, 865, 871, 872, 875; 248/476, 479, 481

(56) References Cited

U.S. PATENT DOCUMENTS

| | | | |
|---|---|---|---|
| 4,932,769 | * 6/1990 | Goosen | 359/865 |
| 5,291,337 | * 3/1994 | Greger et al. | 359/846 |
| 5,517,367 | * 5/1996 | Kim et al. | 359/864 |
| 5,748,395 | * 5/1998 | Rendi, Jr. | 359/841 |
| 6,050,939 | * 4/2000 | Pak Wai | 600/248 |

* cited by examiner

*Primary Examiner*—Mohammad Y. Sikder

(57) ABSTRACT

A rear view dual mirror assembly comprises a convex mirror on the front and a plane mirror on the reverse side. Whole assembly rotates 360 degrees and tilts/pivots on a fixed base, and is mounted on top of a computer monitor, or on the side of the monitor, using a two sided adhesive foam pad attached to the base. The plane mirror also rotates in its housing, and is used as a vanity mirror, and the convex wide angle mirror is used to achieve the best way to stay aware of your surroundings.

1 Claim, 3 Drawing Sheets

FIG. 1   FIG. 2   FIG. 3
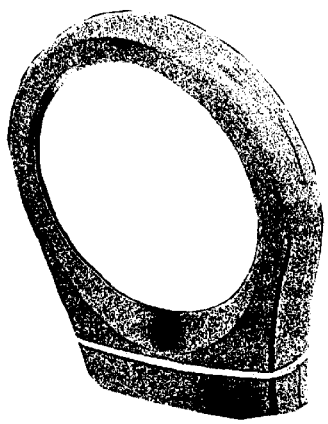
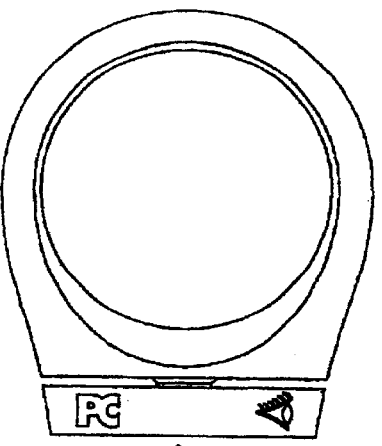
ADHESIVE MOUNTING PAD
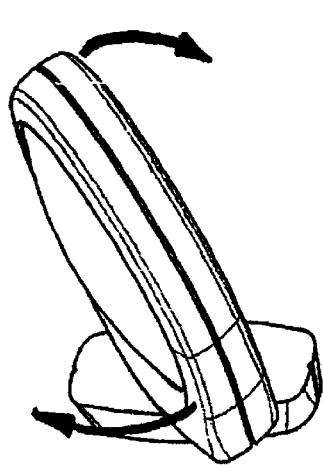
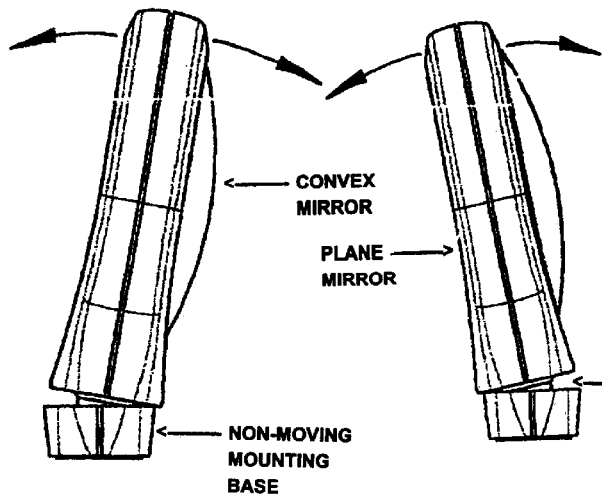
CONVEX MIRROR
PLANE MIRROR
NON-MOVING MOUNTING BASE
PIVOT FEATURE FOR MIRROR FRAME
FIG. 4   FIG. 5   FIG. 6

PC-EYE REAR VIEW DUAL MIRROR ASSEMBLY WITH CONVEX MIRROR

BACKGROUND TO THE INVENTION

The field of endeavor that this invention pertains to is the safety and personal security of an individual that works in an office cubicle, and also the lack of amenities for personal grooming within the cubicle. It was noticed over a number of years that in order for someone working in a work space such as a cubicle, or a small office, where there is the bare minimum of space to set up the work tools for efficient utilization, most of the time the computer is located away from the entrance. This requires that the user has their back to the entrance, and gives a sense of vulnerability in an uncertain and sometimes stressful environment. High stress in the workplace also predicated developing the pc-eye mirror, to afford the users a piece of mind and allow them to remain aware of their surroundings at all times. The convex wide angle mirror allows them to do this. Users also needed to use a plane mirror for self awareness—making themselves look good, so that they could feel good. The idea of having a plane mirror on the reverse side of the convex mirror was borne. An unexpected advantage of using the plain mirror is that it requires that for the user to be able to see their own face in the plain mirror, while viewing the computer screen mid-center, they must sit about two and a half feet away from the screen, which is adequate distance to minimize the harmful effects of the radiation emitted from the screen.

Most individuals that work in a cubicle, or closed office, have their back towards the entrance, and are unable to immediately observe some-one who approaches or walks into their personal office space. Because they cannot see behind them, they would have to be aware of noise or other auditory signals that would make them aware of that individual's intention of entering their personal space. An office worker is open to assault or surprise visits because the entrance cannot be observed by the worker. It is the intention of this invention to allow the worker to be aware of the surroundings they work in, and also make available, in the same unit, a plane mirror for personal grooming purposes.

Prior to the invention of the pc-eye rear view dual mirror, there was no device that had a convexmirror and a plain mirror in the same unit, and was of such a size (less than one inch width) to fit conveniently onto the side of a monitor, with the functionality of rotating 360 degrees, and tilting forward to capture the view.

BRIEF SUMMARY OF THE INVENTION

The object of the invention was to allow the office workers, by using the wide angle convex mirror, to stay aware of their surroundings, on a continual basis, and afford an easy access to a plain mirror for personal grooming. The advantages of the invention are its ease of use, its high level of accessability, ability to rotate between the plane and the convex mirrors, ability to position the mirrors at 90 degrees so that no reflection is afforded if not required, leaving the user empowered at all times to use or not use the mirrors, without the need to remove it from its fixed location.

BRIEF DESCRIPTION OF THE SEVERAL VIEWS OF THE DRAWINGS

Pages numbered for sheets of drawings—and—Figure number (FIG. #) description.

Page 1/3:—FIG. 1: Pictorial View of pc-eye rear view dual mirror.

FIG. 2: Side View of pc-eye rear view dual mirror

FIG. 3: Front View of pc-eye rear view dual mirror showing the logo (PC and shape of eye).

FIG. 4: View of pc-eye depicting that it turns 360 degrees.

FIG. 5: View of pc-eye rear view dual mirror depicting its utility to tilt forward.

FIG. 6: View of pc-eye rear view dual mirror depicting its utility to tilt backward.

Page 2/3.

Page 3/3.

Composite part numbers

Figure 7:
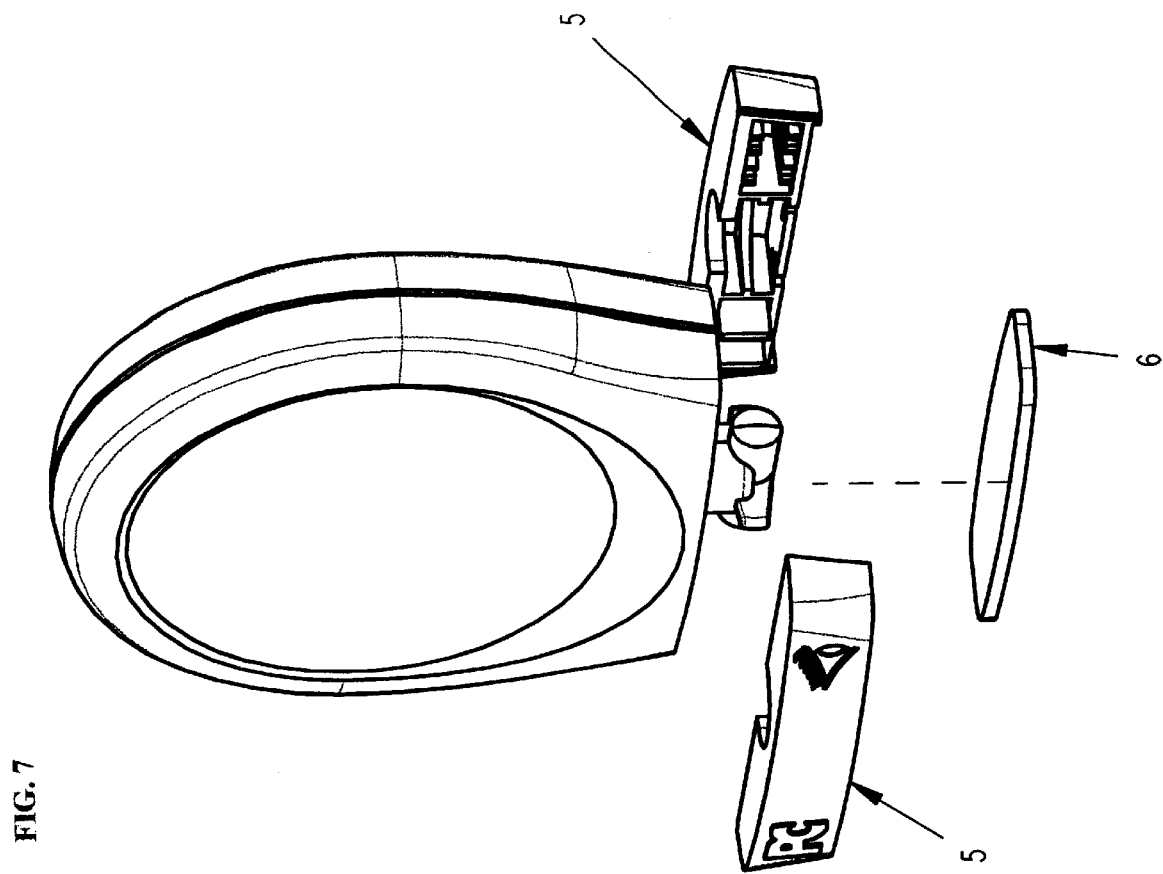
—FIG. 7: Exploded view of pivoting mirror base assembly enclosure (referenced as 5) and two sided adhesive pad that sticks to base #5.
Figure 8:
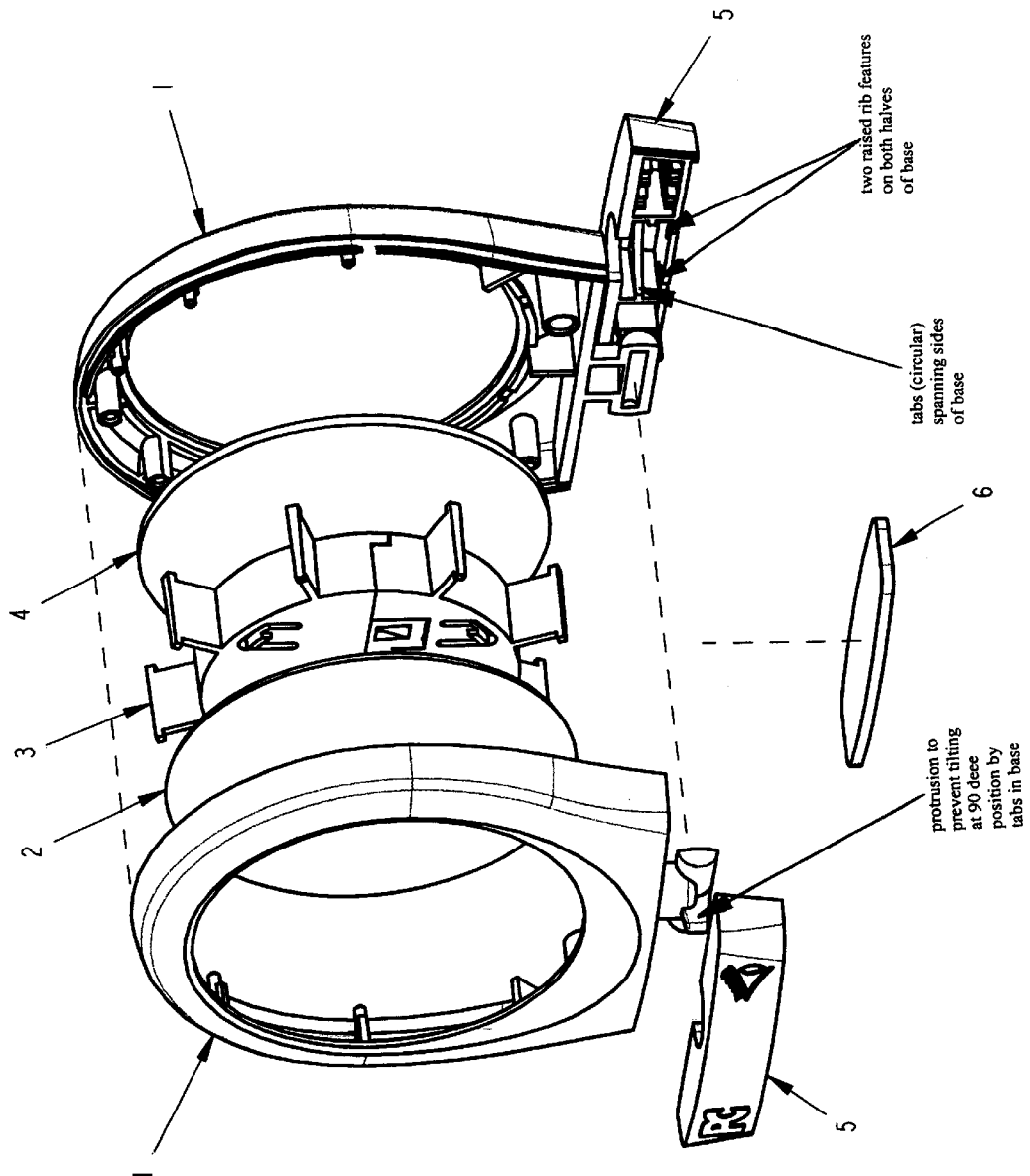
—FIG. 8: Exploded view of the complete pc-eye rear view dual mirror assembly, with separated composite parts to show the relationship and order of assembly.

1 Mirror frame halves (left and right) for retaining the circular mirrors (mirrors referenced as 2 and 4), and a swivel/pivot feature protruding from below the mirror frame halves. Contact is made with the spacer at the indents. There are opposing male and female snaps in the two mirror frame halves that fit together to hold the whole assembly in place.

2 Convex mirror, made of acrylic material.

3 Spacer for the mirrors (numbered 2 and 4). The spacer is manufactured in two sections, which then slide together and snap into place. There are vanes extending out from the circumference which have a design feature to hold the two mirrors in place, and also to fit into indents in the mirror frame halves (reference #1).

4 Plane mirror, made of acrylic material.

5 Base assembly for enclosing pivoting mirror assembly (reference #1). Once the base assembly encloses the mirror assembly, a raised rib feature on the floor of the base assembly provides the friction for the tilt and the rotation. There are also tabs in the base assembly that prevent the upper mirror assembly from tilting when at the 90 degree position relative to the base, from over-traveling, and to make it stop at its frontal view position.

6 Two sided foam adhesive pad.

DETAILED DESCRIPTION OF THE INVENTION

This invention is a unit that has an upper assembly with two mirrors back to back. The upper assembly is connected to a base, and rotates 360 degrees, and tilts backward and forwards. The base is attached to the computer monitor, either at the top or on the side, with an adhesive pad. The upper dual mirror assembly is unique, in that one side has a convex mirror, and the reverse side has a plane flat mirror.

The convex mirror has a wide angle view for the worker, allowing the person to see what is behind him or her. The upper assembly may be rotated to view the plane flat mirror. This mirror is used as a vanity mirror, and allows the worker to perform personal grooming, such as straightening the neck tie, or applying lipstick, in preparation for a meeting.

The invention is aesthetically pleasing, made of a molded plastic material, and the "mirrors" are made of acrylic material with an aluminum coating for the high gloss reflection. Diagrams are included.

The best mode of carrying out this invention is to solve the problem of the lack of visibility of activities taking place behind the back of the office worker, and gives a hind-sight view. This is achieved by placing the unit (called the pc-eye); with the convex mirror positioned on top of the monitor (or on the side of the monitor) and facing towards the office worker. The convex mirror reflects images from behind the office worker sitting at the computer terminal, and allows the person to see all that is happening literally behind their backs. There is an enormous boost to the feeling of personal security and well-being, when the worker is aware of the surroundings within their office work space.

All parts are injection molded, and the mirrors are cut from acrylic sheets coated with aluminum. Once all the parts are arranged for assembly, they are aligned and placed in a fixture and pneumatically pressed together. The spacer in between the two mirrors was arranged such that the convex mirror becomes held rigidly in place, with no movement available, and the plane mirror is not held rigidly in place but has some movement available such that it can be rotated within its housing in a circular motion.

The upper mirror assembly is separated from the lower base (referenced as #5 in several views of the drawing) by a gap, which thereby limits the extent of the tilting of the upper assembly.

Other inventions and products in the market do not have the unique pivot/swivel feature, do not have the novel idea of having a convex mirror and a plane mirror housed in one unit, with the ability to twist 360 degrees, and tilt (pivots), do not have one mirror that is able to rotate in its own housing, and do not have the friction tabs in the base assembly that limits the movement to defined limits. These tabs thereby allow the upper assembly to be tilted to a defined degree so that when the plane mirror is used, the user has to be sitting about 30 inches away to be able to see their reflection.

What we claim as our invention is:

1. A pc-eye rear view dual mirror assembly comprising:

a mirror frame unit for holding a convex mirror, a plane mirror, and a spacer therebetween, said mirror frame unit having a vertical central position;

a fixed base unit for holding and pivoting said mirror frame unit, said mirror frame unit rotates 360 degrees about said vertical central position on said fixed base unit, and tilts back and forth to a defined angle on said fixed base unit;

wherein said fixed base unit having interior tabs and raised rib, said tabs of said fixed base unit limit the mirror frame unit from over traveling past the vertical central position, and the raised rib of said fixed base unit provides friction for maintaining tilt of the mirror frame unit from said vertical position;

means for rotating said plane mirror in said mirror frame unit;

two sided foam adhesive means for attaching said fixed base unit onto one of top or side of a computer monitor.

* * * * *